(12) United States Patent
Eriksson et al.

(10) Patent No.: US 7,622,154 B2
(45) Date of Patent: Nov. 24, 2009

(54) PROCESS FOR THE MANUFACTURE OF DECORATIVE SURFACE ELEMENTS

(75) Inventors: Christina Eriksson, Trelleborg (SE); Roland Larsson, Trelleborg (SE)

(73) Assignee: Pergo (Europe) AB, Trelleborg (SE)

( * ) Notice: Subject to any disclaimer, the term of this patent is extended or adjusted under 35 U.S.C. 154(b) by 656 days.

(21) Appl. No.: 10/481,339

(22) PCT Filed: Jun. 20, 2002

(86) PCT No.: PCT/SE02/01213

§ 371 (c)(1),
(2), (4) Date: Feb. 10, 2004

(87) PCT Pub. No.: WO03/002338

PCT Pub. Date: Jan. 9, 2003

(65) Prior Publication Data

US 2004/0142107 A1    Jul. 22, 2004

(30) Foreign Application Priority Data

Jun. 28, 2001 (SE) .................................. 0102306

(51) Int. Cl.
*B05D 1/36* (2006.01)
*B05D 5/00* (2006.01)

(52) U.S. Cl. ................ 427/258; 427/407.1; 427/428.01

(58) Field of Classification Search .................. 427/258, 427/407.1, 428.01
See application file for complete search history.

(56) References Cited

U.S. PATENT DOCUMENTS

| 2,984,999 | A | * | 5/1961 | Paul ............................... 66/93 |
| 3,041,219 | A | * | 6/1962 | Steck ........................ 428/138 |
| 3,353,341 | A | * | 11/1967 | Stripp ........................ 55/502 |
| 3,373,070 | A | * | 3/1968 | Fuerst ........................ 428/451 |
| 3,870,540 | A | * | 3/1975 | Norgard ..................... 427/180 |
| 4,011,622 | A | * | 3/1977 | Gillum et al. .............. 15/248.2 |
| 4,025,597 | A | * | 5/1977 | Sawamoto ................. 264/138 |
| 4,303,716 | A | * | 12/1981 | Eshbach et al. ............ 428/188 |
| 4,310,581 | A | | 1/1982 | Felter et al. ................. 427/109 |
| 4,353,949 | A | * | 10/1982 | Kyminas et al. ......... 428/195.1 |
| 4,546,922 | A | * | 10/1985 | Thometz ..................... 239/304 |
| 4,683,836 | A | * | 8/1987 | West .......................... 118/305 |
| 5,258,235 | A | | 11/1993 | Mehta et al. ................ 427/530 |
| 5,536,763 | A | * | 7/1996 | Foran .......................... 524/13 |

FOREIGN PATENT DOCUMENTS

| DE | 3539363 | | 5/1987 |
| DE | 19513735 A1 | * | 10/1996 |
| EP | 0680824 | | 11/1995 |

OTHER PUBLICATIONS

International Search Reported dated Sep. 11, 2002.

* cited by examiner

*Primary Examiner*—Elena T Lightfoot
(74) *Attorney, Agent, or Firm*—Novak, Druce & Quigg LLP

(57) ABSTRACT

A process for the manufacturing of decorative surface element, which element comprises a core of a fibrous material, an upper decorative surface and a protective upper wear layer of lacquer. The process comprises the steps; a) Orienting the fiber closest to the upper surface in predetermined pattern, b) applying pigmentation on the upper surface and c) applying protective lacquer on the upper surface.

16 Claims, No Drawings

PROCESS FOR THE MANUFACTURE OF DECORATIVE SURFACE ELEMENTS

This application is a §371 Application of International Application No. PCT/SE02/01213, filed on Jun. 20, 2002, claiming the priority of Swedish Application No. 0102306-8, filed Jun. 28, 2001, the entire disclosures of which are incorporated herein by reference in their entireties.

The present invention relates to a process for the manufacture of decorative surface elements from a fibrous core.

Products coated with simulated versions of materials such as wood and marble are frequent today. They are foremost used where a less expensive material is desired, but also where resistance towards abrasion, indentation and different chemicals and moisture is required. As an example of such products floors, floor beadings, table tops, work tops and wall panels can be mentioned.

As an example of an existing product can be mentioned the thermosetting laminate which mostly consists of a number of base sheets with a decor sheet placed closest to the surface. The decor sheet can be provided with a desired decor or pattern. Frequently used patterns usually represent the image of different kinds of wood or minerals such as marble or granite. There is a constant need for new designs and it has so far been very costly and extremely difficult to achieve decors which changes with the angle of view like the iridescent effect that can be found in for example opal, mother-of-pearl and certain woods like polished birch, According to the present invention it has been made possible to manufacture decorative surface elements where the appearance of the decor will change with the angle of view. The process can be used when manufacturing surface elements like floor boards, wall panels and ceiling panels. Accordingly, the invention relates to a process for the manufacturing of a decorative surface element. The element comprises a core of a fibrous material, an upper decorative surface and a protective upper wear layer of lacquer. The invention is characterized in that the process comprises the steps;

a) Orienting the fibre closest to the upper surface in a predetermined pattern,
b) applying a pigmentation on the upper surface and
c) applying a protective wear layer lacquer on the upper surface.

The pigments may, according to one embodiment of the invention, be mixed with the lacquer of the wear layer.

According to one embodiment of the invention the fibre orientation is achieved by applying a liquid solvent on top of the upper surface. The liquid solvent is hereby suitably applied in a predetermined pattern. The solvent will cause the fibre to rise where applied. The liquid solvent is suitably applied by means of at least one nozzle. This nozzle may be controlled in a manner similar to the print head of an ink-jet printer.

According to an alternative embodiment, the liquid solvent is applied by means of a surface structured calendar roller.

According to a second alternative embodiment the liquid solvent is applied evenly over the surface whereupon the surface is pressed by means of a calendar roller with surface structure.

The liquid solvent is preferably water or an alcohol.

According to another embodiment of the invention the fibre orientation is achieved by milling predetermined portions of the supper surface. The fibre orientation may alternatively be achieved by brushing predetermined portions of the supper surface.

The pattern may simulate wood grain or any kind of fantasy based patterns. The pre-treatment described above will result in a surface consisting of dense surfaces and fleecy surfaces which will absorb and receive a lacquer with different results.

In the next step of the process a lacquer comprising pigments is applied on the upper surface. The pigmented lacquer is suitably applied by means of airbrushing where the airbrush is arranged at an angle of 5-80° from the upper surface. The visual effect can be made more dramatic by applying the pigmented lacquer in two or more steps using two or more colours. In the latter case the pigmented lacquer is suitably applied by means of airbrushing where at least one colour is applied from a direction deviating from the direction of which the other colour or colours is applied. It will hereby be possible to achieve a decor on which the surface with fibres treated as described above will be for example red when looking at it from a first direction and green when looking at it from an opposite direction, provided these two colours are applied from different directions. The denser portion of the surface will have a tendency to display the colour applied last.

A wear layer is applied on the upper surface once the decor is achieved. The wear layer is suitably constituted by a UV- or electron beam curing lacquer such as an acrylic, epoxy, or maleimide lacquer. The wear layer is suitably applied in several steps with intermediate curing where the last one is a complete curing while the earlier ones are only partial. It will hereby be possible to achieve thick and plane layers. The wear layer suitably includes hard particles with an average particle size in the range 50 nm-150 µm. Larger particles, in the range 10 µm-150 µm, preferably in the range 30 µm-150 µm, is foremost used to achieve abrasion resistance while the smaller particles, in the-range 50 nm-30 µm, preferably 50 nm-10 µm is used for achieving scratch resistance. The smaller particles is hereby used closest to the surface while the larger ones are distributed in the wear layer. The hard particles are suitably constituted of silicon carbide, silicon oxide, α-aluminium oxide and the like. The abrasion resistance is hereby increased substantially. Particles in the range 30 mm-150 mm can for example be sprinkled on still wet lacquer so that they at, least partly, becomes embedded in finished wear layer. It is therefore suitable to apply the wear layer in several steps with intermediate sprinkling stations where particles are added to the surface. The wear layer can hereafter be cured. It is also possible to mix smaller particles, normally particle sizes under 30 µm with a standard lacquer. Larger particles may be added if a gelling agent or the like is present. A lacquer with smaller particles is suitably used as top layer coatings, closer to the upper surface. The scratch resistance can be improved by sprinkling very small particles in the range 50 nm-1000 nm on the uppermost layer of lacquer. Also these, so called nano-particles, can be mixed with lacquer, which with is applied in a thin layer with a high particle content. These nano-particles may besides silicon carbide, silicon oxide and α-aluminium oxide also be constituted of diamond.

Surface elements manufactured as described above is suitably used as a floor covering material where the demands on stability and scratch and abrasion resistance is great. It is, according to the present invention, also possible to use the surface elements as wall and ceiling decorative material. It will however not be necessary to apply thick wear layer coatings with high amounts of hard particles in the latter cases as direct abrasion seldom occurs on such surfaces.

According to one embodiment of the invention the wear layer can be provided with an embossed surface. This is suitably achieved by pressing one or more calendar rollers with surface structure towards the surface of the wear layer before the complete curing stage. A thin top coat is suitably applied on top of the structured wear layer. The top coat is suitably comprised of acrylic, epoxy or maleimide lacquer and possibly an additive in the form of hard particles with an average particle size in the range 50 nm-30 μm. The hard particles preferably consists of for example silicon oxide, α-aluminium oxide or silicon carbide.

According to another embodiment of the invention the wear layer comprises at least one layer of so-called overlay paper impregnated with melamine formaldehyde resin. This impregnated overlay paper or the uppermost overlay papers suitably includes hard particles with an average particle size in the range 50 nm 150 μm in order to increase the wear resistance. The hard particles preferably consists of for example silicon oxide, aluminium oxide or silicon carbide. The decor may, according to one special embodiment be enhanced by applying a second decor on top of the decor on the base. This will create a three dimensional decor. This may be achieved by applying a wear layer which comprises a semi-translucent pigmentation. The wear layer may also comprise a printed decor. This printed decor may then be semi-translucent or opaque, covering only parts of the surface of the wear layer. A wear layer of melamine impregnated paper may of course also include embossing as described above. The paper based wear layer is cured through heat and pressure. This curing process is suitably made while joining the wear layer with the base layer.

The base layer are preferably constituted of a particle board or a fibre board but may alternatively be constituted of a polymer such as polyurethane coated with pulp. It is also possible to utilize a base layer consists mainly of a polymer, such as polyurethane, and pulp.

The invention claimed is:

1. A process for the manufacturing of a decorative surface element, where the appearance of the decorative surface changes with angle of view of the surface element, which element comprises a substrate comprising a fiber board, said board further comprising fibers on an upper surface of the board, an upper decorative surface over said upper surface of the board and a protective upper wear layer of lacquer over the decorative surface, wherein the process comprises the steps:
   a) providing a substrate of a fiber board; the board further comprising an upper surface of fibers of the board;
   b) orienting the fibers of the upper surface of the board in a predetermined pattern by applying a liquid solvent on top of the upper surface of the board causing the fibers of the upper surface of the board, where the solvent is applied, to rise from the board,
   c) applying pigment on the upper surface of the board to form the decorative surface, and
   d) applying an upper protective wear layer of lacquer on the upper surface of the decorative surface.

2. A process according to claim 1, the liquid solvent is applied in a predetermined pattern.

3. A process according to claim 2, wherein the liquid solvent is applied by means of a surface structured calendar roller.

4. A process according to claim 1, wherein the liquid solvent is water.

5. A process according to claim 1 wherein a lacquer comprising pigments is applied on the upper surface.

6. A process according to claim 5, wherein the pigmented lacquer is applied by means of airbrushing.

7. A process according to claim 6, wherein the pigmented lacquer is applied at an angle of 5-80° from the upper surface.

8. A process according to claim 5, wherein the pigmented lacquer is applied in two or more steps and two or more colors are used.

9. A process according to claim 8, wherein the pigmented lacquer is applied by means of airbrushing and that at least one color is applied from a direction deviating from the direction of which the other color or colors is applied.

10. A process according to claim 1, wherein the wear layer further comprises at least one layer of overlay paper impregnated with melamine formaldehyde resin.

11. A process according to claim 10, wherein the wear layer further comprises hard particles with an average particle size in the range 50 nm-150μm.

12. A process according to claim 11, wherein the hard particles are selected from the group consisting of particles of at least one of silicon oxide, aluminum oxide and silicon carbide.

13. A process according to claim 10, wherein the wear layer further comprises a semi-translucent pigment.

14. A process according to claim 10, wherein the wear layer further comprises a printed decor.

15. A process according to claim 14, wherein the printed decor is opaque, covering only parts of the surface of the wear layer.

16. A process according to claim 1 wherein the substrate consists of fiber board.

* * * * *